Figure 1:
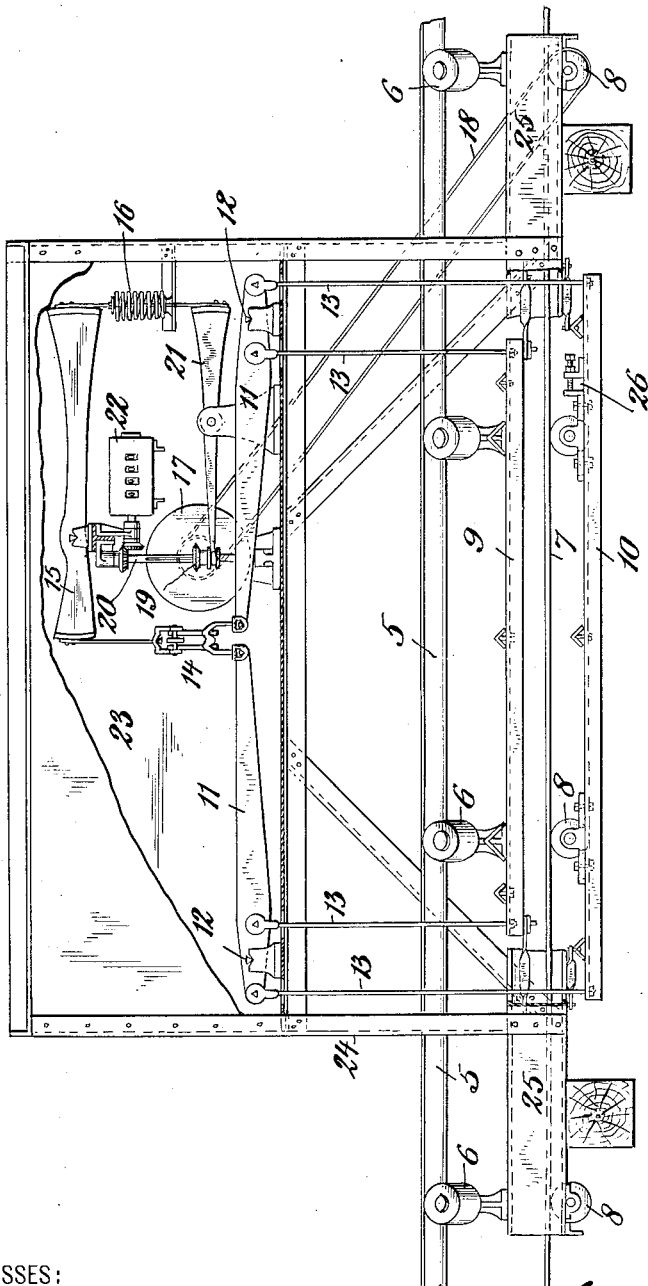

E. H. MESSITER.
WEIGHING MECHANISM.
APPLICATION FILED FEB. 19, 1910.

998,974.

Patented July 25, 1911.

2 SHEETS—SHEET 1.

WITNESSES:

INVENTOR

Edwin H. Messiter
BY
his ATTORNEYS

E. H. MESSITER.
WEIGHING MECHANISM.
APPLICATION FILED FEB. 19, 1910.
998,974.
Patented July 25, 1911.
2 SHEETS—SHEET 2.
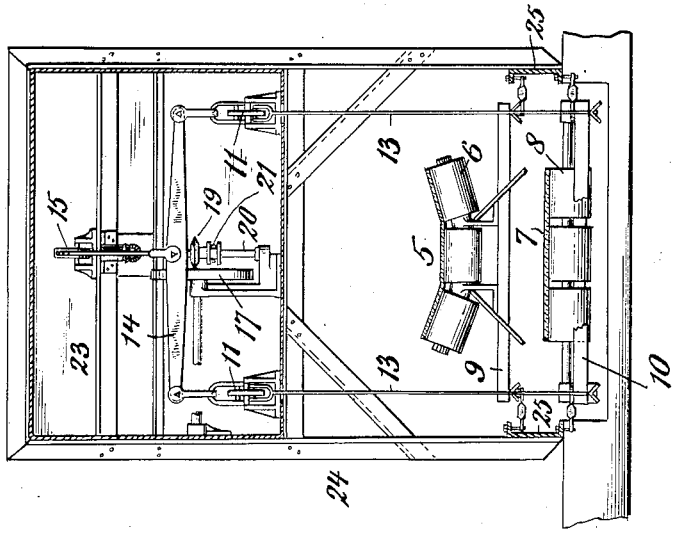
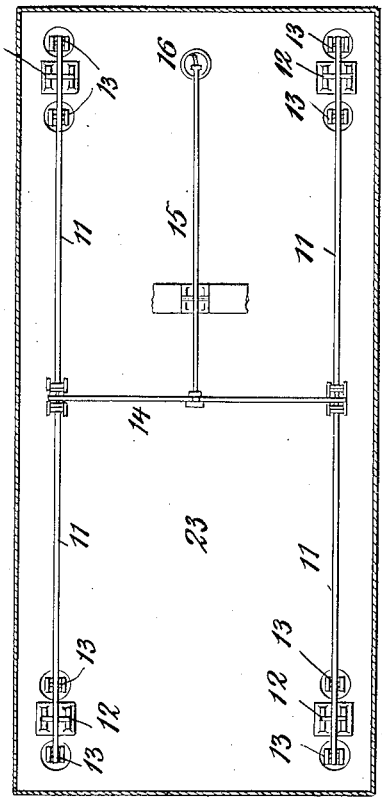
WITNESSES:
INVENTOR
BY
his ATTORNEYS

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

WEIGHING MECHANISM.

998,974.  Specification of Letters Patent.  Patented July 25, 1911.

Application filed February 19, 1910. Serial No. 544,783.

*To all whom it may concern:*

Be it known that I, EDWIN H. MESSITER, a citizen of the United States of America, and a resident of Brooklyn, county of Kings, and State of New York, have invented certain new and useful Improvements in Weighing Mechanism, of which the following is a specification, reference being had to the accompanying drawings, forming a part thereof.

My invention relates to weighing mechanism, and particularly to means for weighing material as it is being carried by belt or similar conveyers. This class of weighing mechanism is known in the art as "continuous" weighing means, and commonly consists in a means for supporting a portion of the belt conveyer carrying the load from a scale beam, which is in turn connected with one element of an integrating device, another element thereof being connected to rotate at a speed proportionate to the speed of travel of the belt, the scale beam being counterbalanced by a dead weight calculated to be equal to the dead weight of the belt carrying the load to be weighed, and parts which support the belt.

I have found by experience that a dead counterbalance is exceedingly unsatisfactory, for the reason that the weight of the belt varies under different conditions,—for instance, where the material carried is wet the belt absorbs considerable moisture, and hence is heavier than when dry material is being carried; when the belt is wet a certain amount of the material carried thereby often adheres somewhat tenaciously to the belt and is carried back with the return or otherwise unloaded portion of the belt, thereby making the weight of belt which should be deducted, still greater; a new belt weighs heavier than an old belt because particles are gradually worn away from the belt in use, and hence a belt gradually becomes lighter in weight in the course of time; and again, a variation in tension upon the belt will vary the weight of a given length thereof.

It is the object of my present invention to reduce the error produced by reason of the foregoing, and I accomplish this by counterbalancing the loaded portion of the belt weighed by means of an unloaded portion of the belt itself. By this means the variations of the dead weight or tare, under different conditions, are provided for and this particular error eliminated or reduced to a minimum.

In order that my invention may be thoroughly understood, I will now proceed to describe an embodiment thereof, having reference to the accompanying drawings illustrating the same, and will then point out the novel features in claims.

In the drawings: Figure 1 is a view in side elevation of an apparatus constructed in accordance with my invention, certain portions thereof being broken away to show other portions to the rear thereof. Fig. 2 is a view in transverse section therethrough. Fig. 3 is a plan view showing the system of scale beams employed, the walls of the chamber inclosing the same being shown in section.

The portions of the belt conveyer shown comprise an active portion 5 usually bent up into trough-like form by angularly disposed idler pulleys 6, and a return portion 7 which is commonly disposed beneath the active portion 6. The entire belt conveyer is of endless form so all parts thereof become successively active and then inactive. The return portion of the belt runs upon idlers 8 which differ from the idlers 6, in that the several members thereof are arranged in the same axial line.

In carrying out my invention I carry one or more (preferably two) idlers 6 upon a suspended frame 9, and corresponding return idler pulleys 8 upon a suspended frame 10. These two frames are supported from scale beam levers 11 pivotally supported at 12. The said frames 9 and 10 are connected with the scale beams by links 13 which connect with the scale beams upon opposite sides of their pivotal supports 12, whereby the one acts as a counterbalance for the other. A convenient construction comprises four of these levers 11 which are connected together at their free ends with a transverse equalizing lever or bar 14 which is in turn connected with one end of a pivotally supported lever 15, the opposite end of which is connected to a spring 16 or other weighing element. The said lever 15 is also connected with a suitable integrating means, a simple form of which is illustrated in the drawings and comprises a rotating disk 17 connected by means of a belt 18 with one of the idlers of the conveyer belt, whereby it will rotate at a speed directly proportionate to the speed of the movement of the belt,—and a driven wheel 19 disposed at right angles to the axis of rotation of the disk 17, the periphery thereof being in engagement with the face of the said disk. The said driven wheel 19 is mounted to slide longitudinally upon a shaft 20 but is disposed in rotative engagement therewith through a spline or similar connection, and it is thus moved longitudinally upon the said shaft by means of an operating lever 21 which is connected at one end with the said lever 15. The shaft 20 is connected through suitable gearing with a counter 22 or other suitable recording or registering device.

When no load is carried by the active portion of the belt 5, the driven wheel 19 of the integrator is arranged to be in a position coincident with the center of rotation of the disk 17, whereby no movement of rotation will be imparted to the shaft 20 by the disk 17. When, however, the active portion 5 of the belt is loaded the driven wheel 19 will be caused to move along its shaft 20 toward the outer edge of the disk 17, to an extent proportionate to the load carried, and a proportionate speed of rotation will hence be imparted from the disk 17 to the wheel 19 and counter 22 or similar device correspondingly operated. As the speed of rotation of the disk 17 is proportionate to the speed of movement of the traveling belt, it will follow that the weight will be registered in accordance with both the speed of the belt and the weight of the material carried thereby, whereby the correct integration will be obtained.

The entire mechanism just described is conveniently inclosed within a chamber 23 supported by a structure 24 which is carried by the main frame 25 of the belt conveying means as a whole. This main frame also serves to carry the idler pulleys 6 and 8 other than those which are carried by the suspended frames 9 and 10, as will be readily understood.

In the operation of the device it will be readily understood that because I have counterbalanced the active portion of the belt being weighed by an inactive or return portion thereof, only the actual weight of the material carried will be registered, and that errors due to variations in the weight of the belt will be automatically taken care of. In practice, I may support any length of the belt preferred, and while I have shown two of the pulleys supported by each of the frames 9 and 10, either more or less than two may be supported if so desired, and it may furthermore be noted that the pulleys on one of the frames may be disposed either slightly closer together or slightly farther apart should the same be found necessary or desirable, to compensate for stretch of the active portion of the belt due to the weight of the load carried, or for a sag of either of the belt portions between the pulleys due to one cause or another. Adjusting means 26 is shown as provided for the purpose of adjusting one of the pulleys 8 toward or away from the other.

It will, of course, be understood that my invention is adapted to be employed in connection with many and varied forms of integrating mechanism, and that the form shown is merely intended as a somewhat conventional illustration of an integrating device generally, and must not be considered in any way as a limitation upon my invention, my present invention considered in its broad aspect consisting of the counterbalancing of the loaded portion of the belt to be weighed with a corresponding unloaded portion thereof, entirely regardless of the manner in which the weight is registered or recorded.

The belt conveyer shown is, of course, only one form of traveling conveyer to which my invention may be applied, and indeed it will be evident that considered in its broad aspect, my invention is capable of being applied to many and varied means for supporting and carrying load.

What I claim is:

1. Means for weighing goods while carried by traveling conveyers comprising means for weighing a goods-carrying portion of the conveyer, and means for so supporting an empty portion of the conveyer as to cause it to act counter to the goods-carrying portion.

2. Means for weighing goods while carried by traveling conveyers comprising means for supporting a goods-carrying portion of the conveyer, means for supporting a corresponding empty portion of the conveyer, and weighing means for weighing the difference between them.

3. Weighing mechanism for traveling conveyers including a pivoted scale beam, a connection from the said beam upon one side of its pivotal connection to a loaded portion of the conveyer, and another connection from the beam upon the other side of its pivotal connection to an unloaded portion of the conveyer.

4. Weighing mechanism for traveling conveyers including a suspended frame, an idler for a loaded portion of the conveyer carried by the said frame, a second suspended frame, an idler for an unloaded portion of the conveyer, carried by the said second frame, means for counterbalancing the first said frame by the second and for weighing the load supported by the first said frame when so counterbalanced.

5. Weighing mechanism for traveling conveyers including a suspended frame, an idler for a loaded portion of the conveyer, carried by the said frame, a second suspended frame, an idler for an unloaded portion of the conveyer, carried by the second frame, means for counterbalancing the first said frame by the second and for weighing the load supported by the first said frame when so counterbalanced, and means for registering the difference in weight between the two frames and parts carried thereby.

6. Weighing mechanism comprising means for counterbalancing a predetermined length of a traveling loaded conveyer by a corresponding section of the unloaded portion thereof, and means for continuously registering the differences in weight between them.

In witness whereof, I have hereunto set my hand this 15th day of February, 1910.

EDWIN H. MESSITER.

Witnesses:
D. HOWARD HAYWOOD,
LYMAN S. ANDREWS, Jr.